United States Patent [19]
Ludwig

[11] Patent Number: 5,934,597
[45] Date of Patent: Aug. 10, 1999

[54] BELT RETRACTOR WITH INTEGRATED FORCE LIMITER

[75] Inventor: Thomas Ludwig, Tutzing, Germany

[73] Assignee: TRW Occupant Restraint Systems GmbH, Alfdorf, Germany

[21] Appl. No.: 09/076,769

[22] Filed: May 12, 1998

[30] Foreign Application Priority Data

May 13, 1997 [DE] Germany ............... 297 08 493 U

[51] Int. Cl.$^6$ ............... B60R 22/28; B60R 22/42
[52] U.S. Cl. ............... 242/379.1; 242/381.1
[58] Field of Search ............... 242/379.1, 381.1; 280/805, 806; 297/470, 471, 472

[56] References Cited

U.S. PATENT DOCUMENTS

| | | | |
|---|---|---|---|
| 3,561,690 | 2/1971 | Muskat | 242/379.1 |
| 4,323,205 | 4/1982 | Tsuge et al. | 242/379.1 |
| 5,618,006 | 4/1997 | Sayles | 242/379.1 |
| 5,772,144 | 6/1998 | Tanabe et al. | 242/379.1 |
| 5,788,177 | 8/1998 | Keller et al. | 242/379.1 |

Primary Examiner—John M. Jillions
Attorney, Agent, or Firm—Tarolli, Sundheim, Covell, Tummino & Szabo

[57] ABSTRACT

A belt retractor with a belt spool rotatably mounted in a frame comprises an integrated force limiter, which has a metal band with a first end connected to the belt spool, and a control part rotatably mounted relative to the belt spool, said control part being able to be locked stationary on the frame by a locking mechanism, said metal band having a second end connected to said control part, said metal band being led through a baffle which is fixed to said control part, and on exceeding of a determined traction force in the belt webbing, said metal band is pulled through said baffle and is thereby plastically deformed. To make the level of the traction force adjustable, on the exceeding of which the deformation of the metal band occurs and hence the force limitation becomes effective, the baffle member has at least one selectively adjustable deflection element the relative position of which with respect to directions in which said metal band extends, defines a level of traction force where said band is pulled through said baffle.

11 Claims, 5 Drawing Sheets

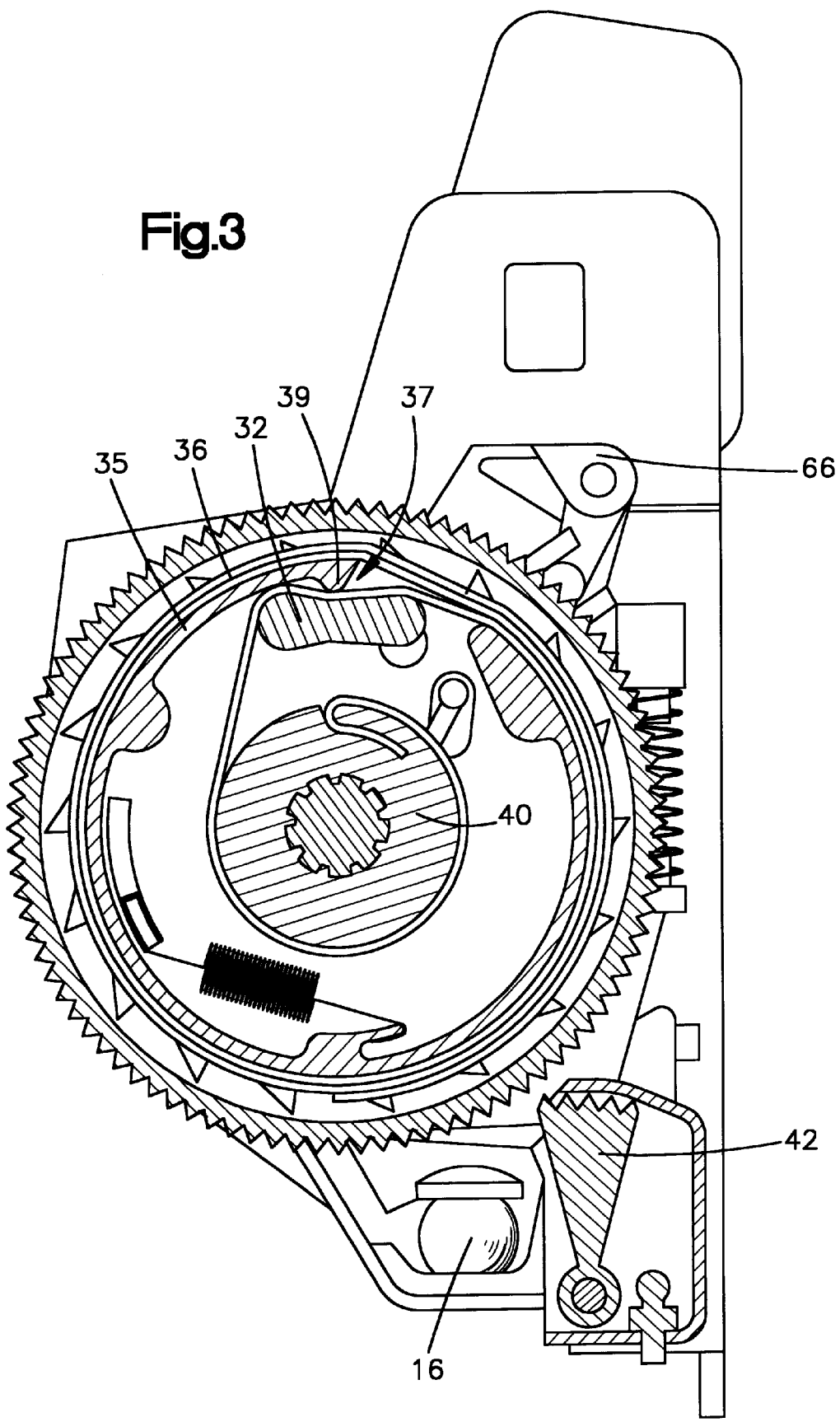

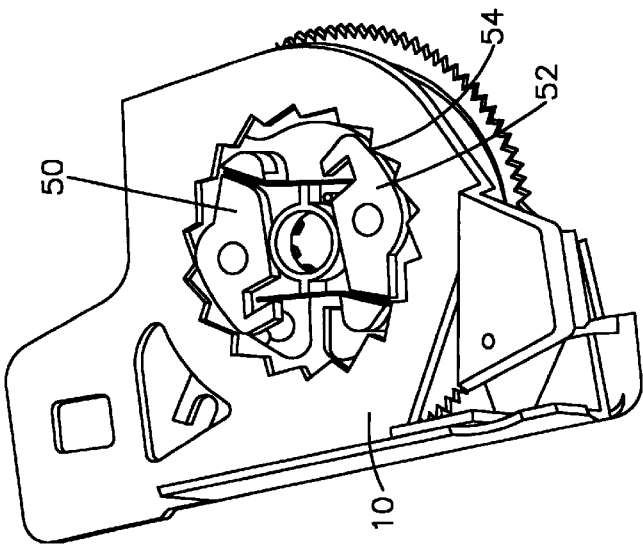
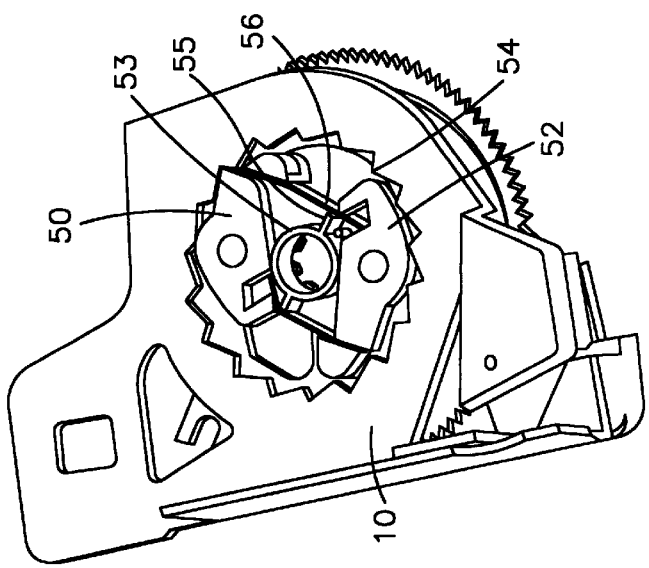
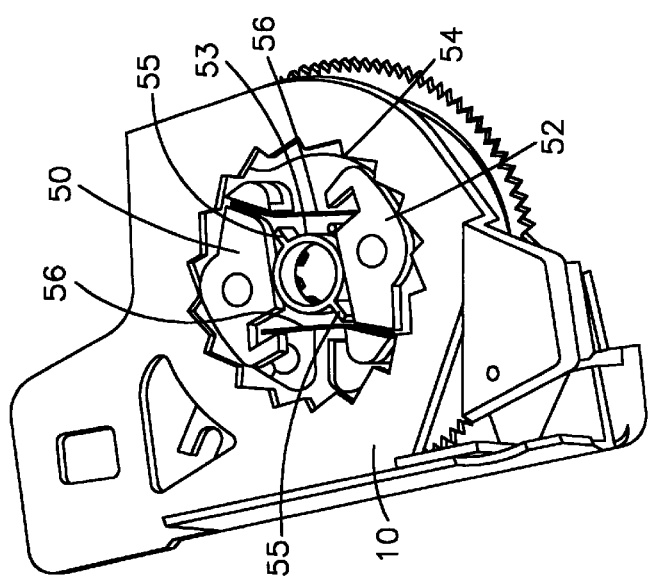

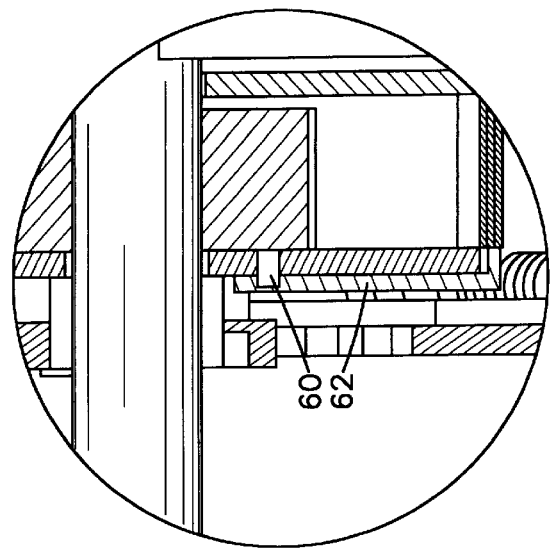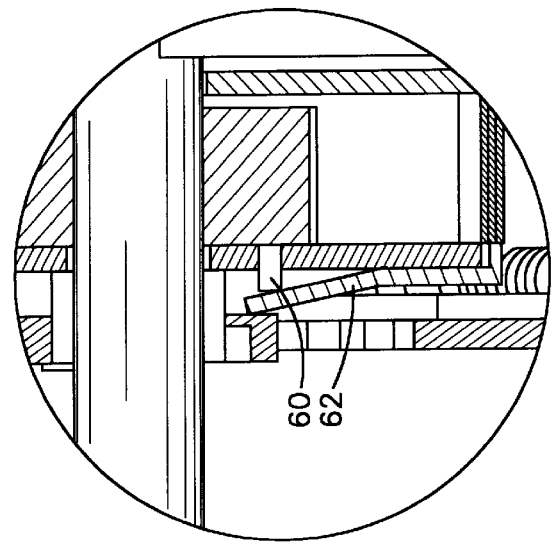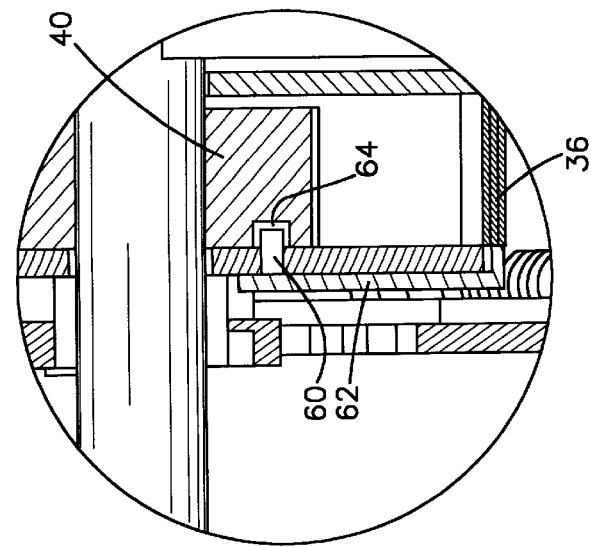

BELT RETRACTOR WITH INTEGRATED FORCE LIMITER

FIELD OF THE INVENTION

The invention relates to a belt retractor with a belt spool mounted rotatably in a frame, and with an integrated force limiter.

BACKGROUND OF THE INVENTION

From the U.S. Pat. No. 5 618 006 a belt retractor with an integrated force limiter is already known, which has a metal band connected by one end to the belt spool and a control part mounted so as to be rotatable relative to the belt spool. The control part is able to be locked non-rotatably to the frame by a locking mechanism in a vehicle-sensitive manner. In addition, the other end of the metal band is connected to the control part and is wound onto the outer periphery of the control part. With an activated locking mechanism and the exceeding of a determined tractive force in the belt webbing, the metal band is pulled through a baffle non-rotatable relative to the control part, and is therefore plastically deformed.

SUMMARY OF THE INVENTION

Through the invention, in a belt retractor of this type of construction the level of the tractive force is made adjustable, on the exceeding of which the deformation of the metal band occurs and hence the force limitation becomes effective. This is achieved according to the invention in that the baffle has at least one selectively adjustable deflection element, through the position of which the level of the determined tractive force is able to be adjusted. As the deflection element in normal operation rotates with the control part and hence with the belt spool, its displacement, in particular pivoting, is not readily possible. In a further development of the invention, provision is made, however, that for the displacement of the deflection element, an adjustment part is used which is rotatable relative to the control part. This adjustment part rotates in normal operation with the control part and, in the case of need, is forcibly rotated by an auxiliary force relative to the control part. Through this relative rotation between control part and adjustment part, the deflection element is pivoted on the control part. This forced pivoting takes place preferably by a control cam/cam follower combination present between the control part and adjustment part. The auxiliary force for the forced rotation of the adjustment part is made available by a pyrotechnic adjusting drive in the preferred embodiment.

According to the position of the deflection element on the control part, a greater or lesser force is necessary in order to draw the metal band through the baffle, because the metal band is deflected and hence deformed to a greater or lesser extent. The displacement of the deflection element can be triggered by a sensor which emits a signal representative of the weight or the size of the vehicle occupant. Through this signal, the pyrotechnic adjusting drive can be triggered. In this way, an adaptation of the force limiting characteristic to the mass of a vehicle occupant is possible.

The subject matter of the invention is, in addition, a belt retractor of the type initially mentioned, with the particularity that through relative rotation between control part and belt spool a switching element is activated, which subsequent to a force limitation by plastic deformation of the metal band, activates a blocking mechanism, which prevents further unwinding of belt webbing from the belt spool. This blocking mechanism is constructed as a belt webbing clamp in the preferred embodiment. As switching element, in a particularly simple manner, a part can be used which is axially displaceable with respect to the belt spool, in particular a pin, the displacement of which is determined by a control cam/cam follower combination formed between control part and belt spool.

BRIEF DESCRIPTION OF THE DRAWINGS

FIG. 3 is a sectional view taken along line III—III in FIG. 2;

FIGS. 4a, 4b and 4c are perspective views of the belt retractor of FIG. 1 illustrating a locking mechanism responsive to angular acceleration; and FIGS. 5a, 5b and 5c are sectional views of a portion of the belt retractor of FIG. 1 illustrating a switching mechanism for activating a belt webbing clamp.

DESCRIPTION OF THE PREFERRED EMBODIMENT

Figure 1:
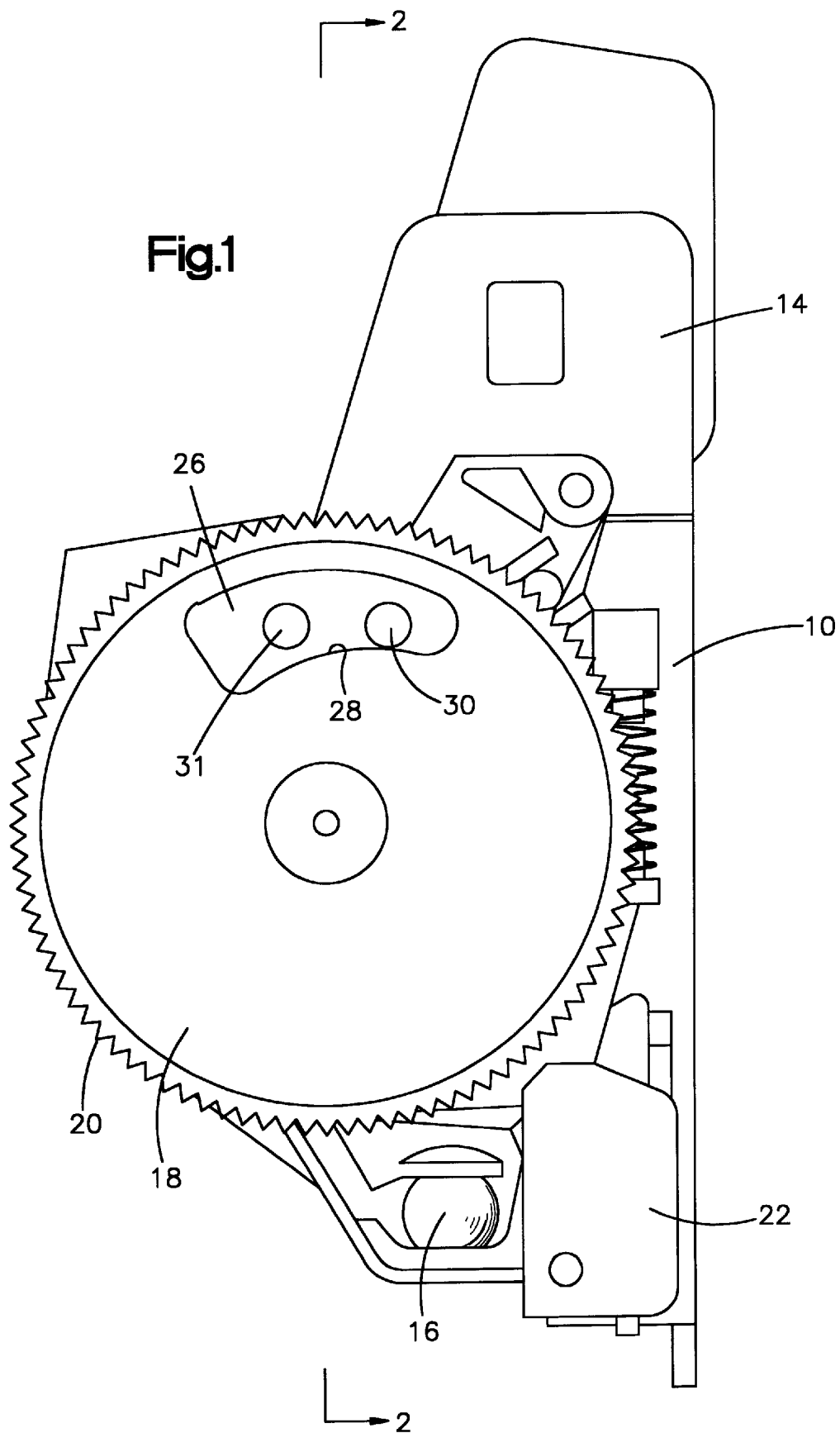
FIG. 1 is a side view of a belt retractor constructed in accordance with the present invention.

FIG. 1 shows a side view of the belt retractor with integrated force limitation and with a locking mechanism which is constructed as a belt webbing clamp. In FIG. 1 a load bearing frame 10 can be seen, in which a belt spool 12 (FIG. 2) is rotatably mounted, a belt webbing clamp 14, a vehicle-sensitive sensor 16, an adjusting disc 18 with external toothing 20 and a pyrotechnic adjusting drive 22.

Figure 2:
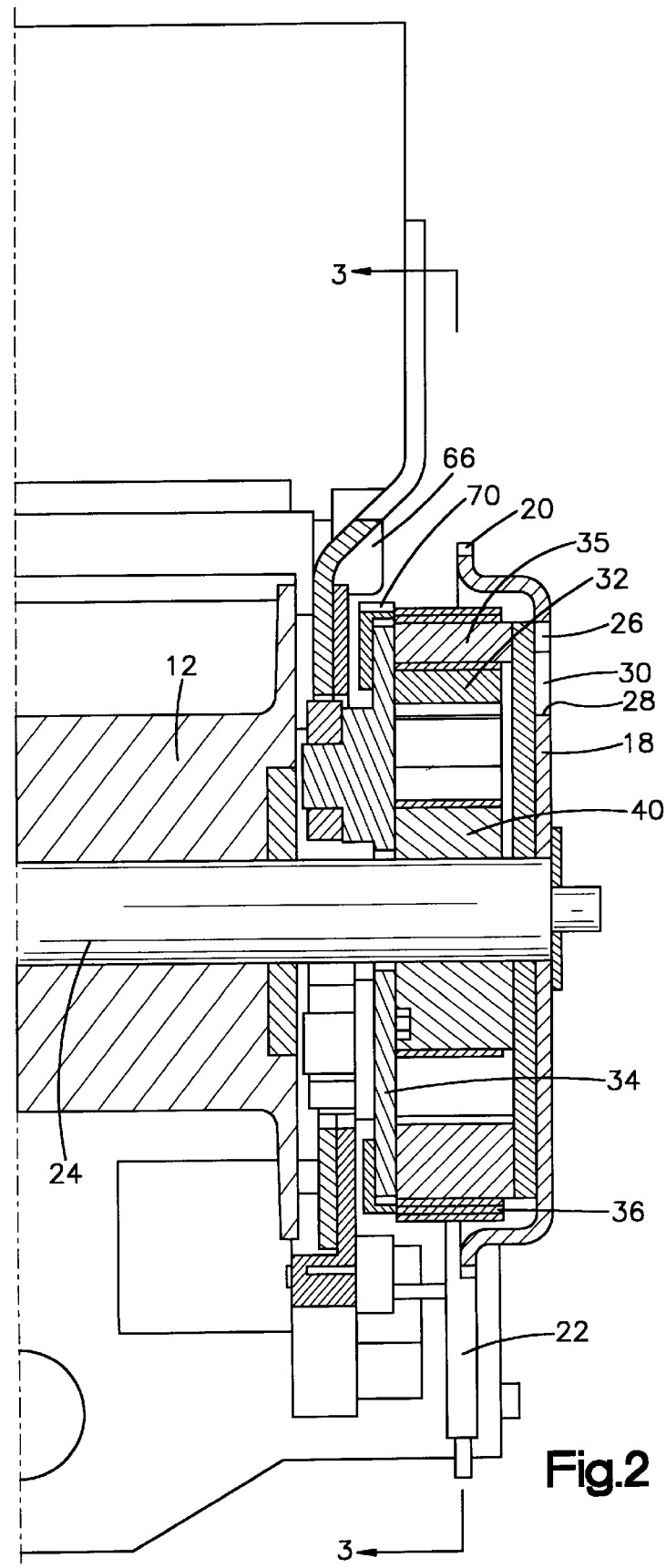
FIG. 2 is a sectional view taken along II—II in FIG. 1.

FIG. 2 is a section along line II—II in FIG. 1. The adjusting disc 18 sits on the outer end of an axis 24 of the belt spool 12 and has a cut-out 26 with a control cam 28. A journal 30 cooperates with the control cam 28, which journal 30 is connected to a deflection element 32. The deflection element 32 is pivotably mounted on a by another journal 31. A metal band 36 is wound in several windings onto the outer circumference of an axially projecting rim portion 35 of the control disc 34. The metal band 36 runs from the outer circumference of the rim portion 35 of the control disc 34 through a baffle 37, which is formed between the deflection element 32 and a cam 39 on the rim portion of the control disc 34.

FIG. 3 is a section along line III—III in FIG. 2. It shows the course of the metal band 36 through the baffle and then to a cylindrical core 40 sitting non-rotatably on the axis 24, to which core 40 the inner end of the metal band 36 is secured. In addition, FIG. 3 shows a swivellable pinion segment 42, which on activation of the pyrotechnic adjusting drive 22 is rotated counterclockwise into engagement with the toothing 20 and thus brings about a forced clockwise rotation of the adjusting disc 18 relative to the control disc 34. Through this forced rotation, the journal 30 is released in accordance with a radial component of the control cam 28, thus allowing the deflection element 32 to pivot in a clockwise direction about the journal 31 into a position requiring greater force to draw the metal band 36 through the baffle 37.

In FIGS. 1 and 3, the deflection element 32 is shown in a baseline position where the tractive force required to pull the band 36 through the baffle is at its lowest. When it is desired to increase the amount of tractive force, such as if a sensor (not shown) senses the presence of a heavy seat occupant, the pyrotechnic drive 22 causes the pinion segment 42 to swivel counterclockwise which, in turn, causes the adjusting disc 18 to rotate clockwise relative to the control disk 34. This rotation of the adjusting disc 18 moves the cut-out 26 and, thus, the control cam 28 on which the journal 30 rests. The journal 30, to which the deflection element 32 is fixedly connected, moves downward, allowing the deflection element to rotate clockwise about the journal 31 mounted on the control disk 34.

FIGS. 4a, 4b and 4c show a locking mechanism with two locking catches 50, 52 responding on angular acceleration, which cooperate with a locking toothing 54 on the frame 10. The catches 50, 52 are pivotably mounted on the control disc 34. FIG. 4a shows the normal operation and FIG. 4b the locking state, in which the load is introduced into the frame 10 via the catches 50 and 52, respectively. FIG. 4c shows the state after force limitation is completed.

After load limiting, a ring 53 with two radial projections 55 which is coupled to the belt spool has been rotated relative to the control disc 34. The radial projections 55 of the ring 53 then abut against leaf springs 56 which act onto the catches 50 and 52, the free length of the leaf springs thereby being shortened and the spring force acting onto the catches 50 and 52 being raised. After load limiting, unwinding of the belt webbing from the belt spool is not any more prevented by controlling the catches 50 and 52 into the locking toothing 54 but by activation of the belt webbing clamp 14.

FIGS. 5a, 5b and 5c show a switching mechanism which switches the belt retractor, in the course of the force limitation, into a state of readiness to activate the belt webbing clamp 14. The switchover takes place by an axially displaceable pin 60 which, on relative rotation between belt spool and control disc 34, is pressed axially outwards by a ramp 64 in the cylindrical core 40, whereupon, through further rotation, an elastically deflectable tongue 62 snaps behind this pin 60. The activation of the belt webbing clamp 14 then takes place by means of a controlling lever 66 (FIG. 3) which is activated by the vehicle-sensitive sensor 16, by its catch engaging in the control toothing 70 (FIG. 3) on the outer circumference of the control disc 34.

I claim:

1. A belt retractor with an integrated force limiter, said belt retractor having belt webbing wound on a belt spool which is rotatably mounted in a frame, said belt retractor comprising:

a control part rotatably mounted relative to the belt spool;

a locking mechanism operable to lock said control part to the frame;

a metal band having a first end connected to the belt spool and a second end connected to said control part; and a deflection element pivotably mounted on said control part, said deflection element and a portion of said control part forming a baffle through which said metal band extends, the position of said deflection element relative to directions in which said metal band extends being selectively adjustable;

said metal band being plastically deformed by being pulled through said baffle when the tractive force in the belt webbing exceeds a predetermined amount.

2. The belt retractor according to claim 1 further comprising an adjusting part which is rotatable relative to said control part, said adjusting part being operable to adjust the position of said deflection element.

3. The belt retractor according to claim 2 further including a pyrotechnic drive for causing rotation of said adjusting part relative to said control part.

4. The belt retractor according to claim 2 wherein a control surface is located on one of said adjusting part and said deflection element, and a cam follower is located on the other of said deflection element and said adjusting part, said cam follower converting a radial component of said control surface into a displacement movement of said deflection element.

5. The belt retractor according to claim 2 wherein a drive toothing is arranged on the periphery of said adjusting part, said belt retractor further comprising a drive part engageable with said drive toothing to cause said adjusting part to rotate relative to said control part.

6. The belt retractor according to claim 5, wherein said drive part comprises a swivellable pinion segment.

7. The belt retractor according to claim 1 wherein said control part has a control toothing into which a locking catch mounted on the frame is operable to engage, said locking catch being controlled by a vehicle-sensitive sensor.

8. The belt retractor according to claim 1 wherein said locking mechanism has at least one locking catch pivotably mounted on said control part, said at least one locking catch, in response to angular acceleration, being operable to engage a locking toothing on the frame.

9. A belt retractor with an integrated force limiter, said belt retractor having belt webbing wound on a belt spool which is rotatably mounted in a frame, said belt retractor comprising:

a control part rotatably mounted relative to the belt spool;

a locking mechanism operable to lock said control part to the frame;

a metal band having a first end connected to the belt spool and a second end connected to said control part;

a deflection element pivotably mounted on said control part, said deflection element and a portion of said control part forming a baffle through which said metal band extends;

said metal band being plastically deformed by being pulled through said baffle when the tractive force in the belt webbing exceeds a predetermined amount;

a blocking mechanism for preventing unwinding of the belt webbing from the belt spool; and a switching element for activating said blocking mechanism subsequent to said metal band being plastically deformed by said baffle, said switching element being activated by relative rotation between said control part and the belt spool.

10. The belt retractor according to claim 9 wherein said switching element is axially displaceable with respect to the belt spool, the displacement of said switching element being determined by a control cam/cam follower combination formed between said control part and the belt spool.

11. The belt retractor according to claim 9 wherein said blocking mechanism comprises a belt webbing clamp.

* * * * *